US012173868B1

(12) United States Patent
Chen

(10) Patent No.: US 12,173,868 B1
(45) Date of Patent: Dec. 24, 2024

(54) GROUND-INSERTED LAMP STRING

(71) Applicant: Guangdong Lianrun Intelligent Technology Co., Ltd., Guangdong (CN)

(72) Inventor: Kunpeng Chen, Jiujiang (CN)

(73) Assignee: Guangdong Lianrun Intelligent Technology, Huizhou (CN)

( * ) Notice: Subject to any disclaimer, the term of this patent is extended or adjusted under 35 U.S.C. 154(b) by 0 days.

(21) Appl. No.: 18/435,995

(22) Filed: Feb. 7, 2024

(51) Int. Cl.

| | |
|---|---|
| ***F21V 17/06*** | (2006.01) |
| ***F21S 4/10*** | (2016.01) |
| ***F21V 1/00*** | (2006.01) |
| ***F21V 15/015*** | (2006.01) |
| ***F21V 23/00*** | (2015.01) |
| ***F21V 23/06*** | (2006.01) |

(52) U.S. Cl.
CPC ................ *F21V 17/06* (2013.01); *F21S 4/10* (2016.01); *F21V 1/00* (2013.01); *F21V 15/015* (2013.01); *F21V 23/001* (2013.01); *F21V 23/06* (2013.01)

(58) Field of Classification Search
CPC ......... F21V 17/06; F21V 23/001; F21V 23/06
See application file for complete search history.

(56) References Cited

U.S. PATENT DOCUMENTS

| | | | | |
|---|---|---|---|---|
| 5,274,537 | A * | 12/1993 | Altman | F21V 21/0824 428/7 |
| 5,911,501 | A * | 6/1999 | Katz | F21V 21/0824 362/267 |
| 6,135,623 | A * | 10/2000 | Lin | F21V 17/14 362/431 |
| 6,910,918 | B1 * | 6/2005 | Driver | F21V 21/002 362/153.1 |
| 2008/0151545 | A1 * | 6/2008 | Kratz | F21V 21/116 362/249.01 |
| 2019/0101265 | A1 * | 4/2019 | Steele | F21V 17/002 |

* cited by examiner

*Primary Examiner* — Evan P Dzierzynski
(74) *Attorney, Agent, or Firm* — Justin Lampel

(57) ABSTRACT

The present disclosure relates to a ground-inserted lamp string, which relates to the technical field of lamp strings. The ground-inserted lamp string achieves detachable assembling between the lampshade and the lamp holder through rotatable clamping between the ground insertion assembly and the lampshade, so that users can quickly change different lampshades according to different needs, thus improving the diversity and universality of the ground-inserted lamp string.

8 Claims, 8 Drawing Sheets

GROUND-INSERTED LAMP STRING

TECHNICAL FIELD

The present disclosure relates to the technical field of lamp strings, and specifically relates to a ground-inserted lamp string.

BACKGROUND

With the continuous improvement of people's living standards, in different usage requirements and occasions, it is required to have a lamp string that meets the usage requirements and matches the usage situation as an ambient or landscape lamp, to enhance the atmosphere or add beauty. It is an indispensable lighting fixture for regulating the atmosphere and is widely used in parks, squares, residential areas, streets, courtyards, etc.

In traditional ground-inserted lamp strings, corresponding lampshades for shaping are often needed for different holiday scenes, such as skull lampshades for Halloween and lantern lampshades for New Year's Eve. However, most of the existing ground-inserted lamp strings use an integrated structure between the lampshade and the ground insertion structure, which makes it impossible to disassemble the lampshade. Therefore, it is not possible to change lampshades with different shapes according to holiday scenes. Moreover, it is not convenient for transportation. Therefore, improvements are needed.

SUMMARY

The purpose of the present disclosure is to provide a ground-inserted lamp string aiming at the shortcomings and deficiencies of the prior art, which has the advantages of convenience in transportation, easiness in assembling and disassembling, and easiness and quickness in lampshade change.

In order to achieve the above purpose, the present disclosure adopts the following technical solution:

A ground-inserted lamp string, including a plurality of spliceable ground-inserted lamps, each ground-inserted lamp including: a ground insertion assembly with a ground insertion tip, the ground insertion tip being used for being inserted into the ground to fix the ground-inserted lamp; a lamp holder connected with one end of the ground insertion assembly away from the ground insertion tip, a power cord being provided on the lamp holder, a connector being provided on the power cord, the connector being used for achieving electrical connection between adjacent ground-inserted lamps; a light emitting unit connected with the lamp holder; and a lampshade provided on the light emitting unit and the lamp holder in a covering manner, the lampshade being rotatably clamped with one side of the ground insertion assembly away from the ground insertion tip.

In an embodiment, the lampshade is provided with an accommodating chamber and a mounting port communicated with the accommodating chamber, and the ground insertion assembly includes: a ground insertion rod, the ground insertion tip being located at one end of the ground insertion rod away from the lampshade; a mounting seat connected with one end of the ground insertion rod away from the ground insertion tip, the mounting seat being used for assembling the lamp holder; a limiting platform connected with one side of the mounting seat away from the light emitting unit, the limiting platform being fit with an end face of one side of the lampshade close to the ground insertion tip to limit the ground insertion rod from entering the accommodating chamber; and a clamping part convexly provided on an outer sidewall of the mounting seat, a gap being provided between the clamping part and the limiting platform, a sidewall of the mounting port being limited in the gap.

In an embodiment, a mounting notch is provided in the sidewall of the mounting port, and the mounting notch is used for allowing the clamping part to pass through the mounting port to enter the accommodating chamber; and after the limiting platform is abutted with an end face of one side of the lampshade close to the ground insertion assembly, the lampshade or the ground insertion assembly is rotated to enable the sidewall of the mounting port to be clamped into the gap.

In an embodiment, the clamping part is in a trapezoidal shape as a whole, and the size of an end face of one side of the clamping part close to the light emitting unit is larger than the size of an end face of one side close to the limiting platform, so that a sidewall of the clamping part forms an inclined surface.

In an embodiment, a plurality of clamping parts are provided, and the plurality of clamping parts are centrally symmetric around a point on an axis of the mounting seat.

In an embodiment, a mounting groove extending axially is provided in the mounting seat, a sidewall of the mounting groove is provided with a strip-shaped groove running through an inner sidewall and an outer sidewall of the mounting seat, the lamp holder is mounted in the mounting groove, and the power cord is clamped into the strip-shaped groove.

In an embodiment, a clamping port communicated with the strip-shaped groove is provided in the limiting platform, and the power cord is clamped into the clamping port and extends to one side of the ground insertion tip through the clamping port.

In an embodiment, the lamp holder includes: a lamp holder body with a mounting chamber, a positive electrode conductive plate and a negative electrode conductive plate being provided in the mounting chamber, the positive electrode conductive plate and the negative electrode conductive plate being used for achieving electrical connection between the light emitting unit and the power cord; and a bottom cover detachably assembled with the lamp holder body, the bottom cover being used for blocking one end of the mounting chamber and tightly pressing and fixing the power cord.

In an embodiment, the lamp holder body is further provided with a fastening part and a fastening hole, and the bottom cover includes: a blocking part connected with the lamp holder body; a fastening head stretching into the fastening hole and connected with the fastening part, so that the bottom cover is fixedly connected with the lamp holder body; and a pressing part abutted with the power cord, the pressing part tightly pressing and fixing the power cord onto the lamp holder body after the fastening head is connected with the fastening part.

In an embodiment, a first tip is provided on one side of the positive electrode conductive plate away from the light emitting unit, a second tip is provided on one side of the negative electrode conductive plate away from the light emitting unit, and both the first tip and the second tips are used for being inserted into the power cord to achieve electrical connection between the power cord and the positive electrode conductive plate and the negative electrode conductive plate.

By adopting the ground-inserted lamp string provided in the embodiments of the present disclosure, the ground-inserted lamps can be assembled, disassembled and spliced, so that users can splice to obtain a ground-inserted lamp string with a required length according to the size of the scene. Moreover, during transportation, components are separated for transportation and storage, thus improving the convenience in transportation and storage. In addition, detachable assembling between the lampshade and the lamp holder is achieved through rotatable clamping between the ground insertion assembly and the lampshade, so that users can quickly change different lampshades according to different needs, thus improving the diversity and universality of the ground-inserted lamp string.

BRIEF DESCRIPTION OF FIGURES

In order to more clearly describe the technical solutions in the embodiments of the present disclosure or the prior art, the following will briefly introduce the drawings needed in the description of the embodiments or the prior art. It is obvious that the drawings in the following description are only some embodiments of the present disclosure. Those of ordinary skills in the art may obtain other drawings from these drawings without contributing any inventive labor.

DETAILED DESCRIPTION

Figure 1:
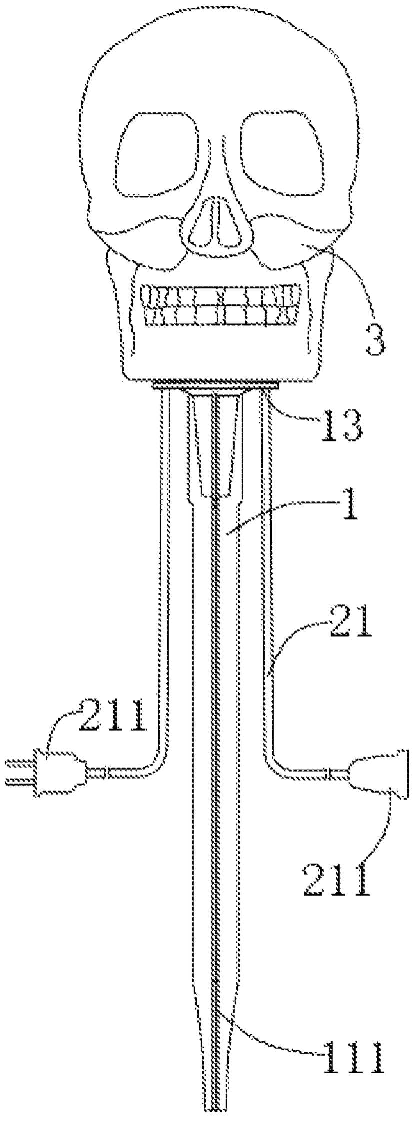
FIG. 1 illustrates a schematic structural diagram of a ground-inserted lamp in an embodiment of the present disclosure.

The solutions in the embodiments of the present disclosure will be clearly and completely described below with reference to the drawings in the embodiments of the present disclosure. Apparently, the described embodiments are merely some rather than all of the embodiments of the present disclosure. All other embodiments obtained by those of ordinary skills in the art based on the embodiments of the present disclosure without contributing any inventive labor shall still fall within the scope of protection of the present disclosure.

In the description of the embodiments of the present disclosure, it is to be understood that, orientation or position relationships indicated by the terms such as “center”, “up”, “down”, “left”, “right”, “vertical”, “horizontal”, “inside” and “outside” are based on orientation or position relationships shown in the drawings, and are used only for conveniently describing the embodiments of the present disclosure and simplifying the description, rather than indicating or implying that the mentioned apparatus or component must have a particular orientation or must be constructed and operated in a particular orientation. Therefore, such terms should not be construed as limitations to the embodiments of the present disclosure. In addition, terms such as “first”, “second” and “third” are only used for the purpose of description and cannot be understood as indicating or implying relative importance.

In the description of the embodiments of the present disclosure, it is to be understood that unless otherwise explicitly specified and limited, the terms “mount”, “connect” and “connection” should be understood in a broad sense. For example, it may be fixed connection, detachable connection or integral connection; it may be mechanical connection; it may also be electric connection; it may be direct connection; it may be connection through an intermediate medium; and it may be communication between two components. Those of ordinary skills in the art can understand specific meanings of the above terms in the embodiments of the present disclosure based on specific situations.

Figure 2:
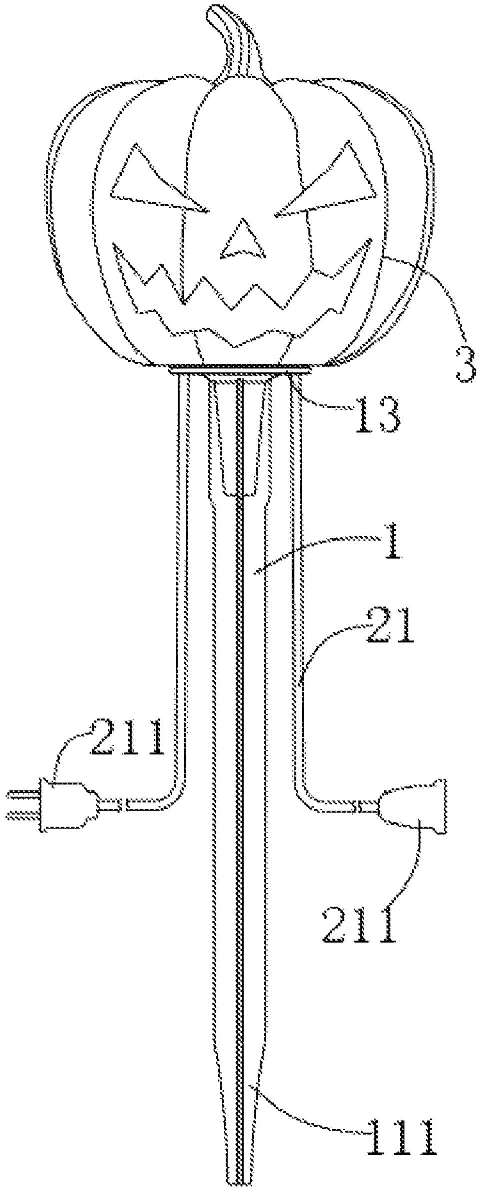
FIG. 2 illustrates a schematic structural diagram of a ground-inserted lamp in another embodiment of the present disclosure.

Please refer to FIG. 1 and FIG. 2. This embodiment relates to a ground-inserted lamp string, which is mainly used in parks, squares, residential areas, streets, courtyards, and other places. Corresponding lampshade shapes can be changed according to different holiday scenes. For example, the Christmas tree lampshade is changed for Christmas, the skull lampshade is changed for Halloween (as shown in FIG. 1), the pumpkin lampshade is changed for Halloween (as shown in FIG. 2), and the lantern lampshade is changed for New Year’s Eve.

It is to be understood that in this embodiment, the ground-inserted lamp string includes a plurality of ground-inserted lamps, and the plurality of ground-inserted lamps can be combined in use by splicing, so that users can freely splice and use according to the required number of ground-inserted lamps, thus improving the diversity and universality of the ground-inserted lamp string. Below, description will be made by taking a single ground-inserted lamp with a skull lampshade as an example.

Please refer to FIG. 1 to FIG. 4. In an embodiment, the ground-inserted lamp mainly includes a ground insertion assembly 1, a lamp holder 2, a light emitting unit 3, and a lampshade 4. Specifically, the ground insertion assembly 1 is provided with a ground insertion tip 111. The ground insertion tip 111 is used for being inserted into the ground to fix the ground-inserted lamp. The lamp holder 2 is connected with one end of the ground insertion assembly 1 away from the ground insertion tip 111. A power cord 21 is provided on the lamp holder 2. A connector 211 is provided on the power cord 21. The connector 211 is used for achieving electrical connection between adjacent ground-inserted lamps. The light emitting unit 3 is connected with the lamp holder 2 and is used for emitting light after being powered on to illuminate the lampshade 4. The lampshade 4 is provided on the light emitting unit 3 and the lamp holder 2 in a covering manner. The lampshade 4 is rotatably clamped with one end of the ground insertion assembly 1 away from the ground insertion tip 111.

It is to be understood that the connector 211 of the ground-inserted lamp located at the head end is used for being connected with an external power supply, thus supplying power to all ground-inserted lamps that make up the ground-inserted lamp string through the power cord 21. The ground insertion assembly 1 and the lampshade 4 are rotatably clamped, so that the lamp holder 2 and the lampshade 4 can be assembled and disassembled, and users can change different lampshades 4 according to different holiday scenes, thus not only improving the diversity of the ground-inserted lamp string, but also enhancing its applicability, and making it suitable for more scenes. In addition, rotatable clamping makes it very easy to disassemble and assemble the lampshade 4 and the lamp holder 2, thus helping users to quickly change the lampshade 4.

In an embodiment, the lampshade 4 is provided with an accommodating chamber 40. A mounting port 41 communicated with the accommodating chamber 40 is provided in an end face of one side of the lampshade 4 close to the ground insertion assembly 1. One end of the ground insertion assembly 1 passes through the mounting port 41 and extends into the accommodating chamber 40, and is rotatably clamped with a sidewall of the mounting port 41 to achieve detachable connection between the lamp holder 2 and the lampshade 4.

Please refer to FIG. 3 to FIG. 6. In an embodiment, the ground insertion assembly 1 includes a ground insertion rod 11, a mounting seat 12, a limiting platform 13, and a clamping part 14. Specifically, the ground insertion rod 111 is located at one end of the ground insertion rod 11 away from the lampshade 4. The mounting seat 12 is connected with one end of the ground insertion rod 11 away from the ground insertion tip 111. The mounting seat 12 is used for assembling the lamp holder 2. The limiting platform 13 is connected with one end of the mounting seat 12 away from the light emitting unit 3. The limiting platform 13 is fit with an end face of one side of the lampshade 4 close to the ground insertion tip 111 to limit the ground insertion rod 11 from extending into the accommodating chamber 40. The clamping part 14 is convexly provided on an outer sidewall of the mounting seat 12. A gap 15 is provided between the clamping part 14 and the limiting platform 13. A sidewall of the mounting port 41 is limited in the gap 15, so that the ground insertion assembly 1 is tightly clamped and fixed with the lampshade 4.

In an embodiment, a mounting groove 120 extending axially is provided in the mounting seat 12. A sidewall of the mounting groove 120 is provided with a strip-shaped groove 121 running through an inner sidewall and an outer sidewall of the mounting seat. The lamp holder 2 is mounted in the mounting groove 120. The power cord 21 is clamped into the strip-shaped groove 121.

It is to be understood that in this embodiment, the mounting seat 12 is in a cylindrical shape as a whole, and in order to ensure the clamping stability of the lampshade 4 and the ground insertion assembly 1, the mounting port 41 is arranged to be circular, and the radial size of the mounting port 41 is slightly larger than the radial size of the mounting seat 12. Therefore, in order to enable the clamping part 14 to smoothly enter the accommodating chamber 40, a mounting notch 411 is provided in the sidewall of the mounting port 41, and the mounting notch 411 is communicated with the mounting port 41. When the ground insertion assembly 1 is clamped with the lampshade 4, it is necessary to firstly align the clamping part 14 with the mounting notch 411, then push the ground insertion assembly 1 towards the side of the lampshade 4, so that the limiting platform 13 is abutted with the end face of the mounting port 41 of the lampshade 4, and finally, rotate the lampshade 4 or the ground insertion assembly 1 to enable the sidewall of the mounting port 41 to be clamped into the gap 15.

Please continue to refer to FIG. 3 to FIG. 6. In an embodiment, a clamping port 131 communicated with the strip-shaped groove is provided in the limiting platform 13. The power cord 21 is clamped into the clamping port 131 and extends to one side of the ground insertion tip through the clamping port 131, so that when the ground-inserted lamp string is mounted, the power cord 21 is laid on the ground to effectively prevent users from tripping over the power cord 21. In addition, laying the power cord 21 on the ground can effectively ensure the aesthetics of the site.

In an embodiment, the clamping part 14 is in a trapezoidal shape as a whole, and the size of an end face of one side of the clamping part 14 close to the light emitting unit 3 is larger than the size of an end face of one side close to the limiting platform 13, so that a sidewall of the clamping part 14 forms an inclined surface. This arrangement allows the sidewall of the mounting port 41 to be smoothly clamped into the gap 15 when the ground insertion assembly 1 or the lampshade 4 is rotated, thus improving the convenience in mounting the lampshade 4.

In an embodiment, a plurality of clamping parts 14 are provided, and the plurality of clamping parts 14 are centrally symmetric around a point on an axis of the mounting seat 12. Obviously, the arrangement of the plurality of clamping parts 14 can improve the firmness and reliability of the assembling between the ground insertion assembly 1 and the lampshade 4. In this embodiment, two clamping parts 14 are provided.

Please refer to FIG. 4, FIG. 5, and FIG. 7 to FIG. 9. In an embodiment, the lamp holder 2 further includes a lamp holder body 22 and a bottom cover 23. Specifically, the lamp holder body 22 is provided with a mounting chamber 220, and a positive electrode conductive plate 221 and a negative electrode conductive plate 222 are provided in the mounting chamber 220. The light emitting unit 3 is connected with one side of the mounting chamber 220 away from the bottom cover 23, and is electrically connected with the positive electrode conductive plate 221 and the negative electrode conductive plate 222. The middle of the power cord 21 is connected with the positive electrode conductive plate 221 and the negative electrode conductive plate 222 respectively. The bottom cover 23 is detachably assembled with the lamp holder body 22 and is used for blocking one end of the mounting chamber 220 of the lamp holder body 22. When the bottom cover 23 is connected with the lamp holder body 22, it can also tightly press and fix the power cord 21.

In an embodiment, a mounting platform 223 is provided on one side of the mounting chamber 220 close to the bottom cover 23, and the mounting platform 223 is connected with an inner wall of the mounting chamber 220. A mounting groove (not shown) is provided in the middle of the mounting platform 223. The positive electrode conductive plate 221 is mounted in the mounting groove. One end of the positive electrode conductive plate 221 is connected with the power cord 21, and the other end is connected with an end face of one side of the light emitting unit 3 close to the bottom cover 23. A sidewall of the mounting chamber 220 is provided with a socket (not shown) that extends along an axis direction of the lamp holder body 22. The negative electrode conductive plate 222 is inserted into the socket and is connected with the lamp holder body 22. One end of the negative electrode conductive plate 222 is connected with the power cord 21, and the other end is connected with a sidewall of a head part of the light emitting unit 3.

It is to be understood that in this embodiment, the connector 211 is a power plug and a power socket that can be adapted to each other. When a plurality of ground-inserted lamps are spliced to form a ground-inserted lamp string, the arrangement of the connector 211 can achieve connection between adjacent ground-inserted lamps through the power plug of one ground-inserted lamp and the power socket of another ground-inserted lamp, and so on, thus forming a ground-inserted lamp string. By adopting such arrangement of the ground-inserted lamp string, the ground-inserted lamps can be spliced according to the length of the required lamp string, thus making it simple and convenient to use. It is to be specially understood that only one end of the power cord 21 of the ground-inserted lamp located at the tail end of the ground-inserted lamp string is provided with a connector 221, while the other end is sealed or insulated to avoid leakage of the power cord 21. In other embodiments, the connector 211 may also be a USB plug and a USB socket that can be adapted to each other. In other words, the connector 211 only needs to meet the requirements of connection and conduction.

Please continue to refer to FIG. 4, FIG. 5, and FIG. 7 to FIG. 9. In an embodiment, a first tip 2211 is provided on one side of the positive electrode conductive plate 221 away from the light emitting unit 3, and a second tip 2221 is provided on one side of the negative electrode conductive plate 222 away from the light emitting unit 3. When the bottom cover 23 is fastened with the lamp holder body 22, the bottom cover 23 squeezes the power cord 21 towards one side of the light emitting unit 3, causing the first tip 2211 and the second tip 2221 to pierce into different wires inside the power cord 21 and to be connected with the conductive parts of the wires, achieving electrical connection between the power cord 21 and the positive electrode conductive plate 221 and the negative electrode conductive plate 222, and thus achieving electrical connection between the light emitting unit 3 and the power cord 21. Such arrangement can greatly improve the convenience in mounting the power cord 21 and the lamp holder body 22, which is conducive to the production and assembling of ground-inserted lamps.

In an embodiment, the lamp holder body 22 is further provided with a fastening part 224 and a fastening hole 225. The fastening part 224 is located on one side of the fastening hole 225 away from the bottom cover 23. A part of the bottom cover 23 passes through the fastening hole 225 and is fastened with the fastening part 224, so that the bottom cover 23 is detachably connected with the lamp holder body 22.

In an embodiment, the bottom cover 23 includes a blocking part 231, a fastening head 232, and a pressing part 233. Specifically, the blocking part 231 is connected with one side of the lamp holder body 22 away from the light emitting unit 3 to block one end of the mounting chamber 220. The fastening head 232 passes through the fastening hole 225 and is abutted with the fastening part 224, so that the bottom cover 23 and the lamp holder body 22 are detachably fixed. The pressing part 233 is provided on one side of the blocking part 231 close to the light emitting unit 3. The pressing part 233 tightly presses and fixes the power cord 21 onto the lamp holder body 22 after the fastening head 232 is connected with the fastening part 224.

It is to be understood that in this embodiment, a limiting part 226 is provided on one side of the lamp holder body 22 close to the bottom cover 23. When the fastening head 232 is fit with the fastening part 224, the blocking part 231 is abutted with the limiting part 226. On the one hand, it can prevent the blocking part 231 from being completely mounted into the mounting chamber 220, and make the end face of one side of the blocking part 231 away from the light emitting unit 3 flush with the end face of one side of the lamp holder body 22 away from the light emitting unit 3, thus further improving the aesthetics of the overall assembly of the lamp holder 2. On the other hand, it can make the fastening head 232 and the fastening part 224 fastened tightly, thus preventing the fastening head 232 from extending too long and losing the fastening effect.

It is to be also understood that two fastening heads 232 are provided, and correspondingly, two fastening holes 225 and two fastening parts 224 are provided. In this embodiment, fixed ends of the fastening heads 232 are connected with the blocking part 231, and free ends extend towards the side where the light emitting unit 3 is located. The free ends of the two fastening heads 232 slightly extend outward towards opposite sides, so that the free ends of the fastening heads 232 can be quickly clamped into the fastening parts 224 after stretching out of the fastening holes 225, thus improving the firmness of mounting.

Figure 7:
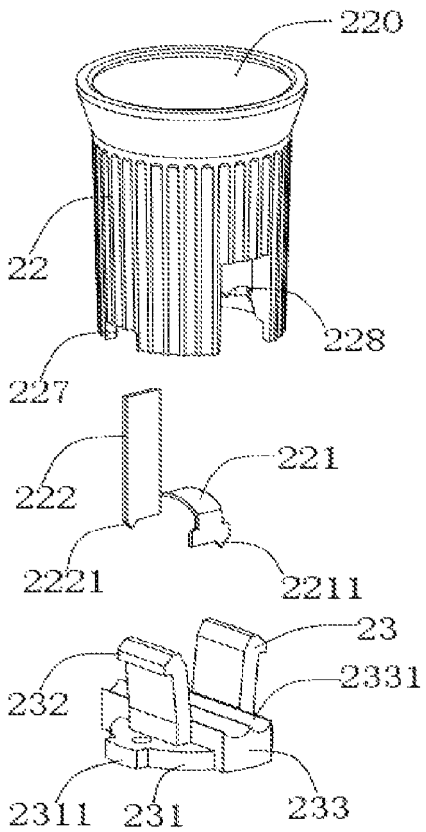
FIG. 7 illustrates an exploded diagram of a lamp holder body and a bottom cover in an embodiment of the present disclosure.
Figure 8:
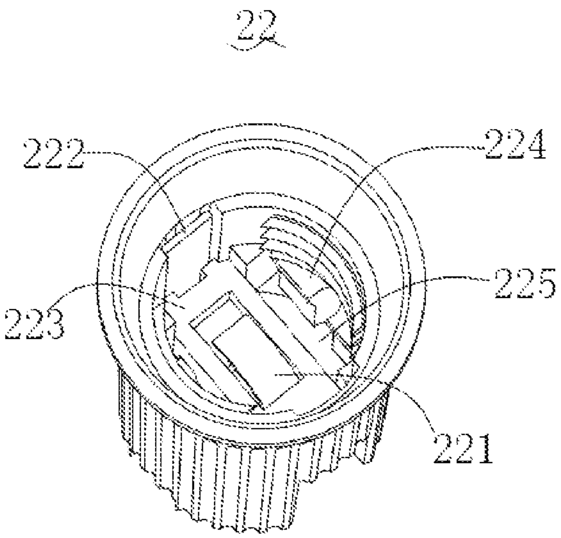
FIG. 8 illustrates a schematic diagram of a first structure of a lamp holder body in an embodiment of the present disclosure.
Figure 9:
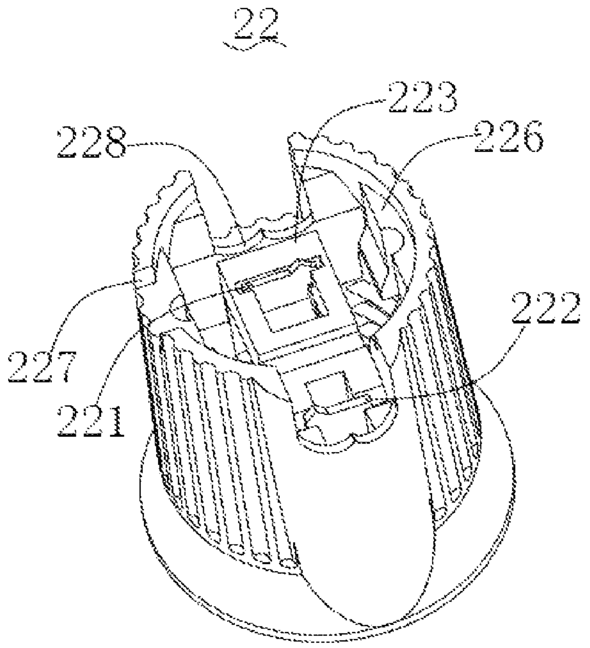
FIG. 9 illustrates a schematic diagram of a second structure of a lamp holder body in an embodiment of the present disclosure.

Please refer to FIG. 7 to FIG. 9. In an embodiment, a positioning block 2311 is provided on the blocking part 231, and a positioning groove 227 is provided in the lamp holder body 22. When the lamp holder body 22 and the bottom cover 23 are assembled, the fitting between the positioning block 2311 and the positioning groove 227 is conducive to the quick disassembling and assembling of the lamp holder body 22 and the bottom cover 23, thus improving the convenience in disassembling and assembling.

In an embodiment, the pressing part 233 is located between two fastening heads 232, and a groove 2331 extending radially is provided in one side of the pressing part 233 away from the blocking part 231. A fixing port 228 is provided in the lamp holder body 22. The power cord 21 is clamped into the fixing port 228. After the bottom cover 23 and the lamp holder body 22 are assembled, the groove 2331 is fit with the fixing port 228 to limit the power cord 21.

It is to be understood that two ends of the pressing part 233 protrude from the sidewall of the blocking part 231. After the bottom cover 23 and the lamp holder body 22 are assembled, two ends of the pressing part 233 are basically flush with the outer sidewall of the lamp holder body 22 to ensure the tightness and aesthetics of the combination between the bottom cover 23 and the lamp holder body 22.

During the assembling of the above ground-inserted lamp, firstly the power cord 21 is clamped into the fixing port 228, then the fastening heads 232 pass into the fastening holes 225, the blocking part 231 is enabled to tightly press the limiting part 226, and the fastening heads 232 are clamped with the fastening parts 224. At this time, under the squeezing effect of the pressing part 233, the positive electrode conductive plate 221 and the negative electrode conductive plate 222 pierce into the power cord 21 to achieve electrical connection; then, after the light emitting unit 3 is connected with the lamp holder body 22, the lamp holder 2 is mounted into the mounting groove 120 and the power cord 21 is clamped into the strip-shaped groove 121 and the clamping port 131; and finally, the clamping parts 14 are aligned with the mounting notch 411 and pushed towards one side of the lampshade 4, so that the limiting platform 13 is abutted with the lampshade 4, and then the lampshade 4 or the ground insertion assembly 1 is rotated to enable the sidewall of the mounting port 41 to be clamped into the gap 15, thus completing the assembling of the ground-inserted lamps. Adjacent ground-inserted lamps are spliced together through connectors 211 to form a ground-inserted lamp string.

By adopting the above ground-inserted lamp string, it is very easy to disassemble and assemble the lampshade 3 and ground insertion assembly 1, so that users can quickly change different lampshades 3 according to different needs, thus improving the diversity and universality of the ground-inserted lamp string. In addition, the ground-inserted lamps can be assembled, disassembled and spliced, so that users can splice to obtain a ground-inserted lamp string with a required length according to the size of the scene. Moreover, during transportation, components are separated for transportation and storage, thus improving the convenience in transportation and storage.

Figure 3:
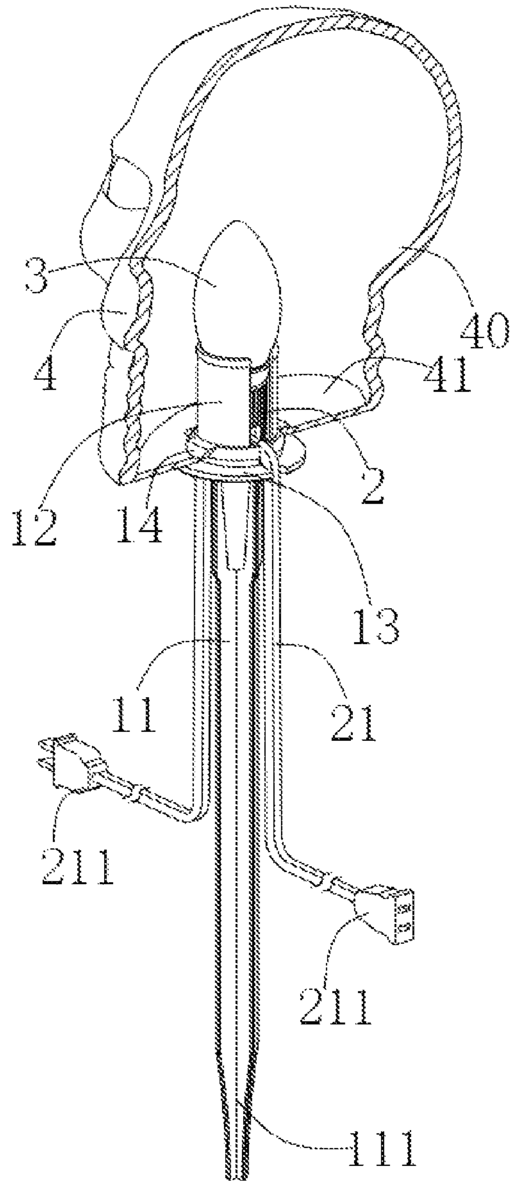
FIG. 3 illustrates a schematic structural diagram after a lampshade is sectioned in an embodiment of the present disclosure.
Figure 4:
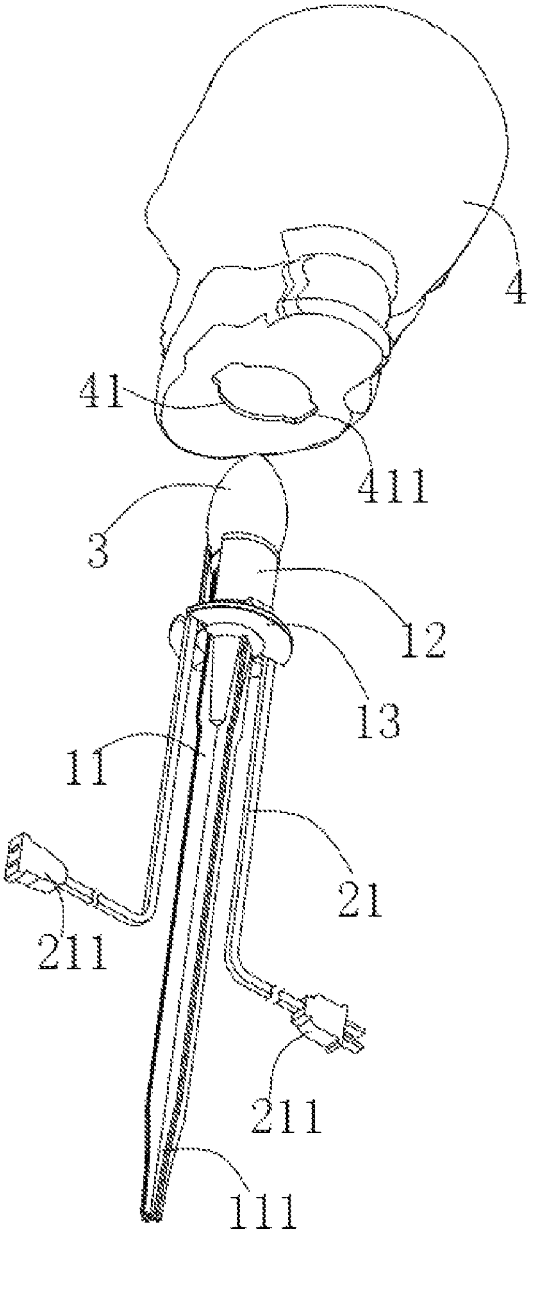
FIG. 4 illustrates a schematic diagram after a lampshade is separated from a ground insertion assembly in an embodiment of the present disclosure.
Figure 5:
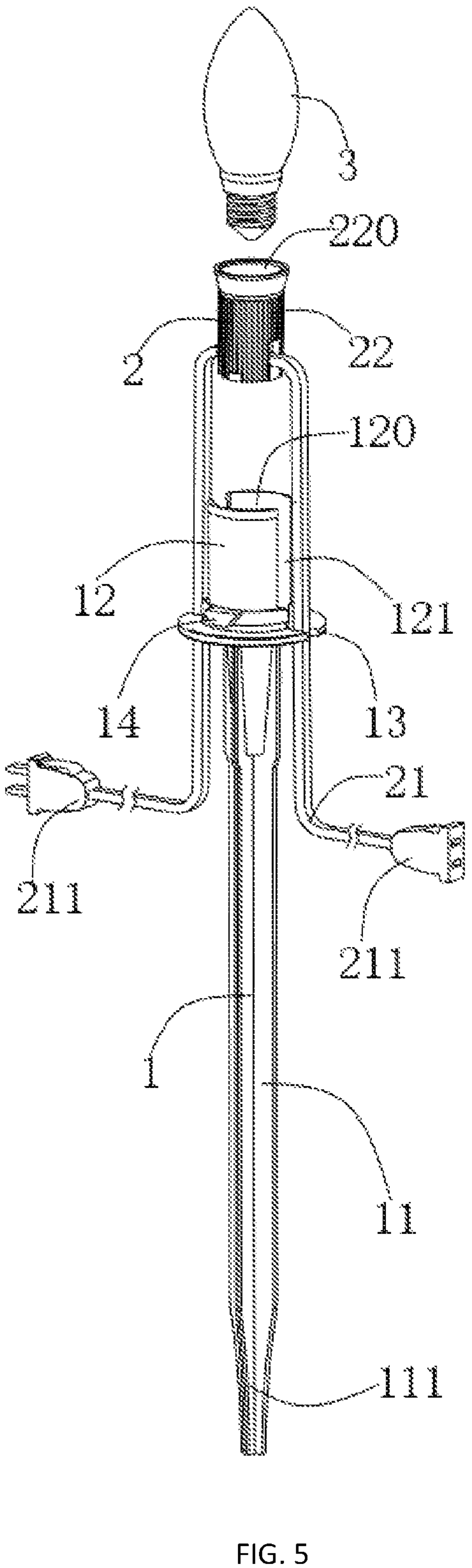
FIG. 5 illustrates a schematic structural diagram of a lamp holder, a light emitting unit and a ground insertion assembly in an embodiment of the present disclosure.
Figure 6:
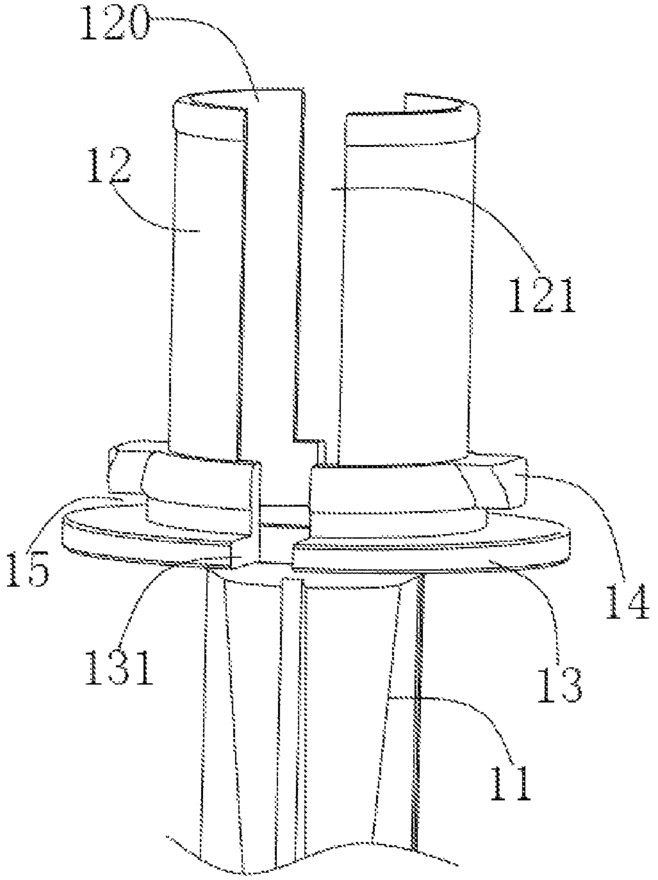
FIG. 6 illustrates a schematic structural diagram of a part of a ground insertion assembly in an embodiment of the present disclosure.
Figure 10:
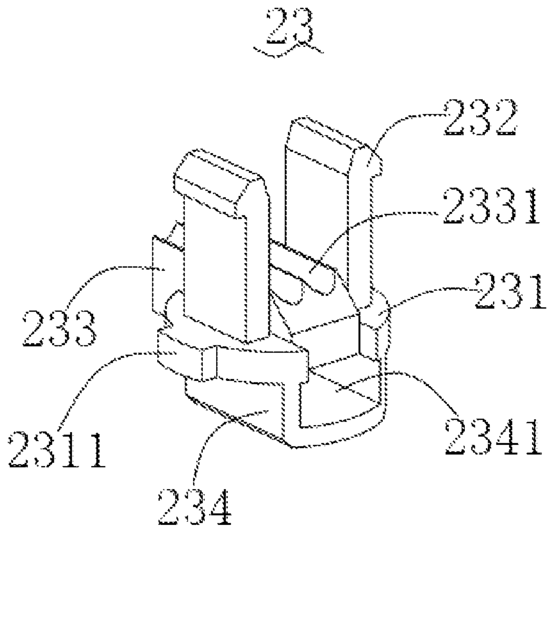
FIG. 10 illustrates a schematic structural diagram of a bottom cover in another embodiment of the present disclosure.

Please refer to FIG. 3, FIG. 5, and FIG. 10. In another embodiment, an accommodating part 234 may also be provided on the bottom cover 23. Specifically, the accommodating part 234 is connected with the end face of one side of the blocking part 231 away from the fastening heads 232. The accommodating part 234 is used for accommodating the end of the power cord 21 of the tail ground plug lamp, so as to prevent the end of the power cord 21 from being exposed, and ensure the practical safety of the ground-inserted lamp string and the overall aesthetics after assembling.

Further, the accommodating part 234 is provided with an accommodating groove 2341. The end of the power cord 21 of the tail ground-inserted lamp is accommodated in the accommodating groove 2341, so as to ensure the overall aesthetics of the lamp holder 2.

What are described above are only used for describing the technical solution of the present disclosure, instead of limiting it. Any other modifications or equivalent replacements made by those of ordinary skills in the art to the technical solution of the present disclosure as long as they do not deviate from the spirit and scope of the technical solution of the present disclosure, should also be included in the scope of the claims of the present disclosure.

What is claimed is:

1. A ground-inserted lamp string, comprising a plurality of spliceable ground-inserted lamps, each ground-inserted lamp comprising:

a ground insertion assembly with a ground insertion tip, the ground insertion tip being used for being inserted into the ground to fix the ground-inserted lamp;

a lamp holder connected with one end of the ground insertion assembly away from the ground insertion tip, a power cord being provided on the lamp holder, a connector being provided on the power cord, the connector being used for achieving electrical connection between adjacent ground-inserted lamps;

a light emitting unit connected with the lamp holder;

a lampshade provided on the light emitting unit and the lamp holder in a covering manner, the lampshade being rotatably clamped with one side of the ground insertion assembly away from the ground insertion tip;

wherein the lampshade is provided with an accommodating chamber and a mounting port communicated with the accommodating chamber, and the ground insertion assembly comprises:

a ground insertion rod, the ground insertion tip being located at one end of the ground insertion rod away from the lampshade;

a mounting seat connected with one end of the ground insertion rod away from the ground insertion tip, the mounting seat being used for assembling the lamp holder;

a limiting platform connected with one side of the mounting seat away from the light emitting unit, the limiting platform being fit with an end face of one side of the lampshade close to the ground insertion tip to limit the ground insertion rod from entering the accommodating chamber; and a clamping part convexly provided on an outer sidewall of the mounting seat, a gap being provided between the clamping part and the limiting platform, a sidewall of the mounting port being limited in the gap.

2. The ground-inserted lamp string according to claim 1, wherein a mounting notch is provided in the sidewall of the mounting port, and the mounting notch is used for allowing the clamping part to pass through the mounting port to enter the accommodating chamber; and after the limiting platform is abutted with an end face of one side of the lampshade close to the ground insertion assembly, the lampshade or the ground insertion assembly is rotated to enable the sidewall of the mounting port to be clamped into the gap.

3. The ground-inserted lamp string according to claim 2, wherein the clamping part is in a trapezoidal shape as a whole, and the size of an end face of one side of the clamping part close to the light emitting unit is larger than the size of an end face of one side close to the limiting platform, so that a sidewall of the clamping part forms an inclined surface.

4. The ground-inserted lamp string according to claim 2, wherein a plurality of clamping parts are provided, and the plurality of clamping parts are centrally symmetric around a point on an axis of the mounting seat.

5. The ground-inserted lamp string according to claim 1, wherein a mounting groove extending axially is provided in the mounting seat, a sidewall of the mounting groove is provided with a strip-shaped groove running through an inner sidewall and an outer sidewall of the mounting seat, the lamp holder is mounted in the mounting groove, and the power cord is clamped into the strip-shaped groove.

6. The ground-inserted lamp string according to claim 5, wherein a clamping port communicated with the strip-shaped groove is provided in the limiting platform, and the power cord is clamped into the clamping port and extends to one side of the ground insertion tip through the clamping port.

7. A ground-inserted lamp string, comprising a plurality of spliceable ground-inserted lamps, each ground-inserted lamp comprising:

a ground insertion assembly with a ground insertion tip, the ground insertion tip being used for being inserted into the ground to fix the ground-inserted lamp;

a lamp holder connected with one end of the ground insertion assembly away from the ground insertion tip, a power cord being provided on the lamp holder, a connector being provided on the power cord, the connector being used for achieving electrical connection between adjacent ground-inserted lamps;

a light emitting unit connected with the lamp holder;

a lampshade provided on the light emitting unit and the lamp holder in a covering manner, the lampshade being rotatably clamped with one side of the ground insertion assembly away from the ground insertion tip;

a lamp holder body with a mounting chamber, a positive electrode conductive plate and a negative electrode conductive plate being provided in the mounting chamber, the positive electrode conductive plate and the negative electrode conductive plate being used for achieving electrical connection between the light emitting unit and the power cord; and a bottom cover detachably assembled with the lamp holder body, the bottom cover being used for blocking one end of the mounting chamber and tightly pressing and fixing the power cord;

wherein the lamp holder body is further provided with a fastening part and a fastening hole, and the bottom cover comprises:

a blocking part connected with the lamp holder body;

a fastening head stretching into the fastening hole and connected with the fastening part, so that the bottom cover is fixedly connected with the lamp holder body; and a pressing part abutted with the power cord, the pressing part tightly pressing and fixing the power cord onto the lamp holder body after the fastening head is connected with the fastening part.

8. A ground-inserted lamp string, comprising a plurality of spliceable ground-inserted lamps, each ground-inserted lamp comprising:

a ground insertion assembly with a ground insertion tip, the ground insertion tip being used for being inserted into the ground to fix the ground-inserted lamp;

a lamp holder connected with one end of the ground insertion assembly away from the ground insertion tip, a power cord being provided on the lamp holder, a connector being provided on the power cord, the connector being used for achieving electrical connection between adjacent ground-inserted lamps;

a light emitting unit connected with the lamp holder;

a lampshade provided on the light emitting unit and the lamp holder in a covering manner, the lampshade being rotatably clamped with one side of the ground insertion assembly away from the ground insertion tip;

a lamp holder body with a mounting chamber, a positive electrode conductive plate and a negative electrode conductive plate being provided in the mounting chamber, the positive electrode conductive plate and the negative electrode conductive plate being used for achieving electrical connection between the light emitting unit and the power cord; and a bottom cover detachably assembled with the lamp holder body, the bottom cover being used for blocking one end of the mounting chamber and tightly pressing and fixing the power cord;

wherein a first tip is provided on one side of the positive electrode conductive plate away from the light emitting unit, a second tip is provided on one side of the negative electrode conductive plate away from the light emitting unit, and both the first tip and the second tips are used for being inserted into the power cord to achieve electrical connection between the power cord and the positive electrode conductive plate and the negative electrode conductive plate.

* * * * *